(No Model.)
J. F. KELLY.
ELECTRICAL REGULATING DEVICE.
No. 576,732. Patented Feb. 9, 1897.
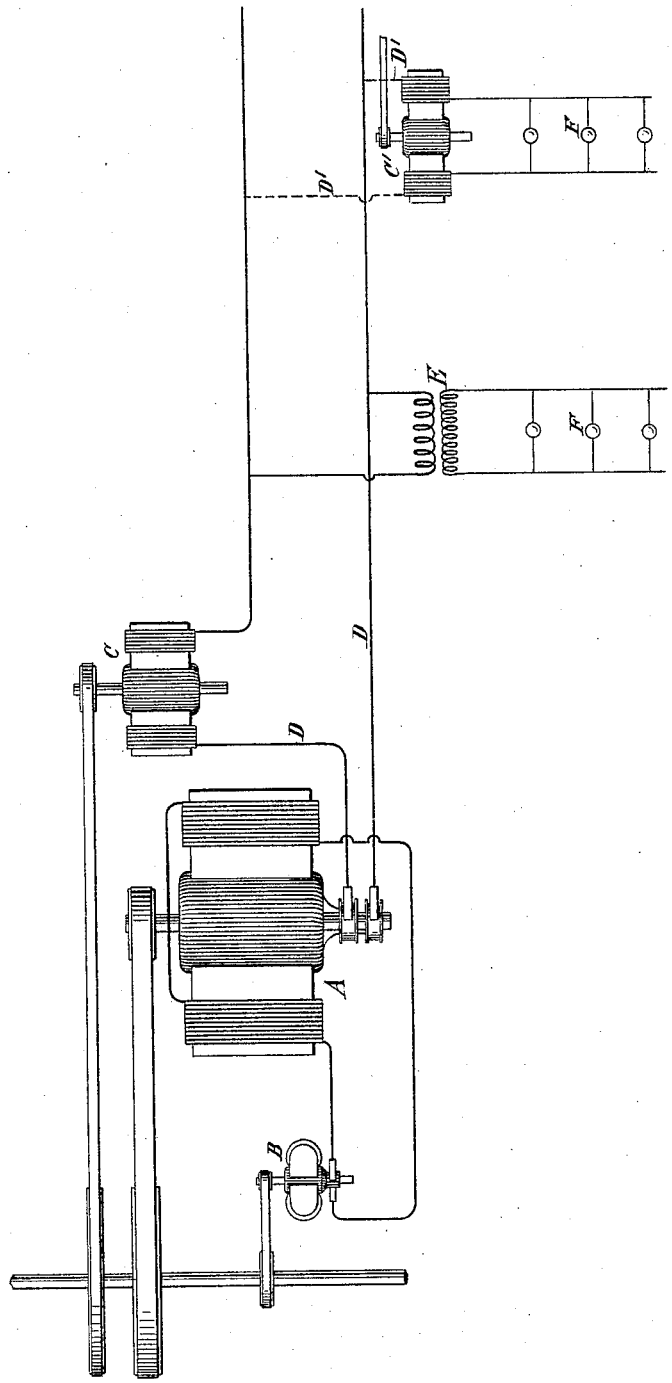
Witnesses
Raphael Netter
James N. Catlow
Inventor
John F. Kelly
By his Attorneys
Duncan & Page

UNITED STATES PATENT OFFICE.

JOHN F. KELLY, OF PITTSFIELD, MASSACHUSETTS, ASSIGNOR TO THE STANLEY LABORATORY COMPANY, OF SAME PLACE.

ELECTRICAL REGULATING DEVICE.

SPECIFICATION forming part of Letters Patent No. 576,732, dated February 9, 1897.

Application filed July 24, 1893. Serial No. 481,261. (No model.)

*To all whom it may concern:*

Be it known that I, JOHN F. KELLY, a citizen of the United States, residing at Pittsfield, in the county of Berkshire and State of Massachusetts, have invented certain new and useful Improvements in Electrical Regulating Devices, of which the following is a specification, reference being had to the drawing accompanying and forming a part of the same.

If an alternating-current induction-motor, that is to say, any motor, whether single or multiphase, which has one coil or set of coils only connected or adapted for connection with a supply-circuit, while the other coil or set of coils is closed, so that the currents developed therein will be due to induction from the first, be driven at a speed above that of synchronism with the generator it acts as a generator, in the sense that the electromotive forces developed in the exciting-coils are in a direction to sustain the exciting current or currents. I have taken advantage of this property to apply and utilize induction-motors of the general character described as a means of regulation for systems of alternate-current distribution by connecting up in a circuit or any branch thereof one of such motors and driving it by any suitable means above synchronous speed. Under such conditions the motor will develop an electromotive force which will be added to the original electromotive force of the primary generator, and since the electromotive force developed in a coil will vary with the current flowing through it this added electromotive force will increase as more current is drawn through the circuit. The effect of this is similar to that secured by the ordinary methods of compounding the generator, while it possesses numerous advantages, in that it involves no commutation or sliding contacts, which such methods require. Moreover, by my invention every feeder may be separately regulated and for any degree of compounding by interposing a separate motor in each of such feeders.

The drawing annexed hereto for purposes of illustration is a diagram of a system to which the invention is applied.

A represents any ordinary alternate-current generator the field of which is excited in any convenient way, as by the small direct-current machine B.

C designates any induction-motor, a type of which is a motor having two or more field-magnets wound with coils connected with the generator-circuit and an armature wound with coils or conductors closed upon themselves. If the field-coils of such a motor be included in the circuit D D from the generator A, the motor tends to run at a certain speed, known as that of "synchronism," when the product of the number of its poles and revolutions per unit of time equals the product of the number of poles and revolutions of the generator.

The induction-motor may be placed at any point in the system or circuit. It is very conveniently located near or combined with the generator, and, as shown, it is belted to the main shaft, but so as to be run somewhat above synchronous speed, this being represented by making its pulley slightly smaller than that of the generator. The circuit from the generator may be employed to run any devices of suitable character, (represented by a transformer E and lamps F.)

In operation, when translating devices are thrown into circuit and more current drawn through the circuit the electromotive force of the induction-motor is increased and added to that of the generator, thus producing the same effect as though the excitation of the generator-field were raised. The converse of this occurs when translating devices are cut out of the circuit.

The excess of speed of the motor over that of synchronism will depend somewhat upon the output and the range of regulation required, but in practice I have found that an excess of about five per cent. is sufficient.

In lieu of placing a motor near the generator and where it will regulate for the entire circuit it is feasible to place it at any other point, and one of the motors may be introduced in any or each branch or feeder and operated in a similar manner. In illustration of this I have shown a feeder D' D' in dotted lines and a motor C' connected therewith.

Such an apparatus as the above is entirely automatic in its action and may be used not only to replace the ordinary compounding but all other devices for regulating feeders which are known in practice as "boosters."

Having now described my invention, what I claim is—

1. The combination of an alternating-current generator used as a source of electrical supply, a circuit from the same for the transmission of the electrical energy developed, and a regulator consisting of an induction-motor connected with the circuit and driven at a speed above that of synchronism as set forth.

2. The combination of an alternating-current generator used as a source of electrical supply, one or more feeders for conveying the current from the same, and a regulator for each feeder, consisting of an induction-motor connected with the feeder and driven at a speed above that of synchronism, as set forth.

3. The combination with an alternating-current circuit and source of current therefor, of translating devices connected or adapted for connection with the circuit, of a regulating device consisting of an induction-motor driven above synchronous speed and having its exciting-coils connected with said circuit, as described.

4. The method herein described of regulating alternating currents, which consists in connecting up in the circuit of an alternating source of current-supply an induction-motor, and operating the same as a regulator by driving it at a speed above that of synchronism with the generator, as set forth.

JOHN F. KELLY.

Witnesses:
LEONARD L. WETMORE,
ERNEST B. CASTLE.